United States Patent
Kim et al.

(10) Patent No.: US 9,142,243 B2
(45) Date of Patent: Sep. 22, 2015

(54) OPTICAL PICKUP AND OPTICAL INFORMATION STORAGE SYSTEM INCLUDING THE SAME

(71) Applicant: Toshiba Samsung Storage Technology Korea Corporation, Suwon-si (KR)

(72) Inventors: Ki-bok Kim, Suwon-si (KR); Jin-ho Jeong, Seoul (KR); Eun-goo Kim, Suwon-si (KR); Jung-bae Oh, Suwon-si (KR); Seung-man Han, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/187,579

(22) Filed: Feb. 24, 2014

(65) Prior Publication Data
US 2014/0241141 A1    Aug. 28, 2014

(30) Foreign Application Priority Data

Feb. 25, 2013  (KR) .................. 10-2013-0020028

(51) Int. Cl.
*G11B 7/1353* (2012.01)
*G11B 7/09* (2006.01)
*G11B 7/1275* (2012.01)
*G11B 7/00* (2006.01)

(52) U.S. Cl.
CPC ............ G11B 7/1353 (2013.01); G11B 7/0903 (2013.01); G11B 7/1275 (2013.01); G11B 2007/0006 (2013.01)

(58) Field of Classification Search
CPC ........... G11B 7/08517; G11B 7/08523; G11B 7/0903; G11B 7/1353; G11B 2007/0006; G11B 7/1275; G02B 5/18; G02B 5/1809; G02B 5/1814; G02B 5/1828
USPC .................. 369/44.37, 53.23, 53.28, 112.01, 369/112.03, 112.05, 112.06, 112.07, 369/112.15, 112.23
See application file for complete search history.

(56) References Cited

U.S. PATENT DOCUMENTS

| | | | | |
|---|---|---|---|---|
| 5,153,863 A | * | 10/1992 | Noda et al. | 369/44.11 |
| 5,615,200 A | * | 3/1997 | Hoshino et al. | 369/112.04 |
| 7,227,704 B2 | * | 6/2007 | Koike | 359/719 |
| 7,260,047 B2 | * | 8/2007 | Nishioka et al. | 369/112.05 |
| 7,426,170 B2 | * | 9/2008 | Ikenaka | 369/112.08 |
| 8,385,181 B2 | * | 2/2013 | Mimori | 369/112.12 |
| 8,498,189 B2 | * | 7/2013 | Fukakusa | 369/112.03 |
| 2003/0223325 A1 | * | 12/2003 | Shimano et al. | 369/44.26 |
| 2007/0230292 A1 | * | 10/2007 | Yamamoto et al. | 369/44.26 |
| 2009/0097381 A1 | * | 4/2009 | Hamano et al. | 369/112.04 |

FOREIGN PATENT DOCUMENTS

| | | |
|---|---|---|
| JP | 2010-33641 A | 2/2010 |
| JP | 2010-97625 A | 4/2010 |
| KR | 10-2005-0097214 A | 10/2005 |
| KR | 10-0567107 B1 | 3/2006 |

* cited by examiner

*Primary Examiner* — Thomas Alunkal
(74) *Attorney, Agent, or Firm* — NSIP Law

(57) ABSTRACT

Provided are an optical pickup and an optical information storage system including the same. The optical pickup includes a photodetector that receives a main light beam and a plurality of sub-light beams reflected from an information storage medium and diffracted by a diffracting element. The photo detector detects a tracking error signal using zeroth-order light as the main light beam and using one of first-order light and third-order light as the sub-light beam based on a type of an optical information storage medium.

18 Claims, 7 Drawing Sheets

OPTICAL PICKUP AND OPTICAL INFORMATION STORAGE SYSTEM INCLUDING THE SAME

CROSS-REFERENCE TO RELATED APPLICATION(S)

This application claims the benefit under 35 USC §119(a) of Korean Patent Application No. 10-2013-0020028, filed on Feb. 25, 2013, in the Korean Intellectual Property Office, the entire disclosure of which is incorporated herein by reference for all purposes.

BACKGROUND

1. Field

The following description relates to an optical pickup capable of implementing a tracking servo compatibly with optical information storage media having various types, and an optical information storage system including the same.

2. Description of Related Art

In order to implement a tracking servo, an optical pickup device may split light into zeroth-order light and first-order light by transmitting the light through a grating, and may perform an operation on signals which are obtained by detecting the zeroth-order light and the first-order light.

In the case of using a grating that has diffraction gratings on a single surface for a digital versatile disc-recordable (DVD-R) and a digital versatile disc-random access memory (DVD-RAM), a 2.5 track method is widely used. During the 2.5 track method, a zeroth-order light and a first-order light irradiated on an optical information storage medium are spaced apart from each other by about 2.5 tracks, and a tracking servo error is implemented using a detection signal that is obtained therefrom.

In the 2.5 track method, for example, when a two-wavelength light source is used, a pitch difference for a compact disc (CD) is relatively large. Thus, upon 2.5 track rotation on the DVD-R basis, a phase difference of about 45 degrees occurs in the case of CD-ROM 650 MB.

Therefore, when the 2.5 track method is implemented using a general grating with diffraction gratings on a single surface, it is difficult to precisely implement a tracking servo for a CD.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, there is provided an optical pickup including a light source unit that emits light comprising a plurality of different wavelengths for a plurality of types of information storage media which each have different recording density and format, a diffracting element that splits light that is incident from the light source unit into a main light beam and a plurality of sub-light beams including first order light and third-order light, and a photodetector that receives the main light beam and the sub-light beams reflected from the information storage medium, and detects a tracking error signal using zeroth-order light as the main light, and further using one of first-order light and third-order light as the sub-light based on a type of the information storage medium.

The plurality of information storage media may comprise a digital versatile disc (DVD) and a compact disc (CD), the light source unit may emit light of the first wavelength for the DVD and light of the second wavelength for the CD, and the third-order light may be used as the sub-light when the information storage medium is the DVD, and the first-order light may be used as the sub-light when the information storage medium is the CD.

The photodetector may comprise a first main light receiving unit and a first sub-light receiving unit that receive the main light and the sub-light, respectively, of the first wavelength, and a second main light receiving unit and a second sub-light receiving unit that receive the main light and the sub-light, respectively, of the second wavelength.

A spacing of the third-order light on the information storage medium may correspond to 2.5 tracks of a DVD-R.

A tracking servo may be implemented with respect to a CD, a DVD-R, and a DVD-RAM.

The diffracting element may split incident light into zeroth-order light, ±first-order light, and ±third-order light.

The diffracting element may exhibit a diffraction efficiency of zeroth-order:first-order:third-order=4-15:0.5-1:1 with respect to the light of the first wavelength.

The diffracting element may comprise a grating in which linear grids are uniformly arranged.

The diffracting element may be provided such that second-order diffraction efficiency becomes zero with respect to the light of the first wavelength.

The optical pickup may further comprise an objective lens that forms a main light spot and a plurality of sub-light spots on the optical information storage medium by focusing the main light beam and the plurality of sub-light beams thereon.

In an aspect, there is provided an optical pickup including a light source unit that emits light comprising a first wavelength for a digital versatile disc (DVD) and a second wavelength for a compact disc (CD), a diffracting element that splits light incident from the light source unit into a main light beam and a plurality of sub-light beams including first order light and third-order light, and a photodetector that receives the main light beam and the plurality of sub-light beams reflected from the information storage medium, and detects a tracking error signal using zeroth-order light as the main light and using one of the first-order light and the third-order light as the sub-light based on whether the information storage medium is a DVD or a CD.

The photodetector may comprise a first main light receiving unit and a first sub-light receiving unit that receive the main light and the sub-light, respectively, of the first wavelength, and a second main light receiving unit and a second sub-light receiving unit that receive the main light and the sub-light, respectively, of the second wavelength, the third-order light is used as the sub-light when the information storage medium is a DVD, the first-order light is used as the sub-light when the information storage medium is a CD, and a tracking servo is implemented with respect to a CD, a DVD-R, and a DVD-RAM.

A spacing of the third-order light on the information storage medium may correspond to 2.5 tracks of a DVD-R.

The diffracting element may split incident light into zeroth-order light, ±first-order light, and ±third-order light.

The diffracting element may exhibit a diffraction efficiency of zeroth-order:first-order:third-order=4-15:0.5-1:1 with respect to the light of the first wavelength.

The diffracting element may be provided such that second-order diffraction efficiency becomes zero with respect to the light of the first wavelength.

The diffracting element may comprise a grating in which linear grids are uniformly arranged.

The light source unit may comprise a twin light source in which first and second light sources emitting the light of the first wavelength and the light of the second wavelength are packaged into a single unit.

In an aspect, there is provided an optical disc drive, including an optical pickup device configured to read data from and/or write data to an information storage medium, the optical pickup device comprising a photodetector that receives a main light beam and a plurality of sub-light beams reflected from the information storage medium, and detects a tracking error signal using zeroth-order light as main light, and further using one of first-order light and third-order light as the sub-light based on a type of the information storage medium, and a controller configured to control the optical pickup device to detect the tracking error signal.

The photo detector may use the first order light as the sub light for tracking error in response to the information storage medium comprising a compact disc (DC), and the photo detector may use the third order light as the sub light for tracking error in response to the information storage medium comprising a digital versatile disc (DVD).

Other features and aspects will be apparent from the following detailed description, the drawings, and the claims.

Figure 1:
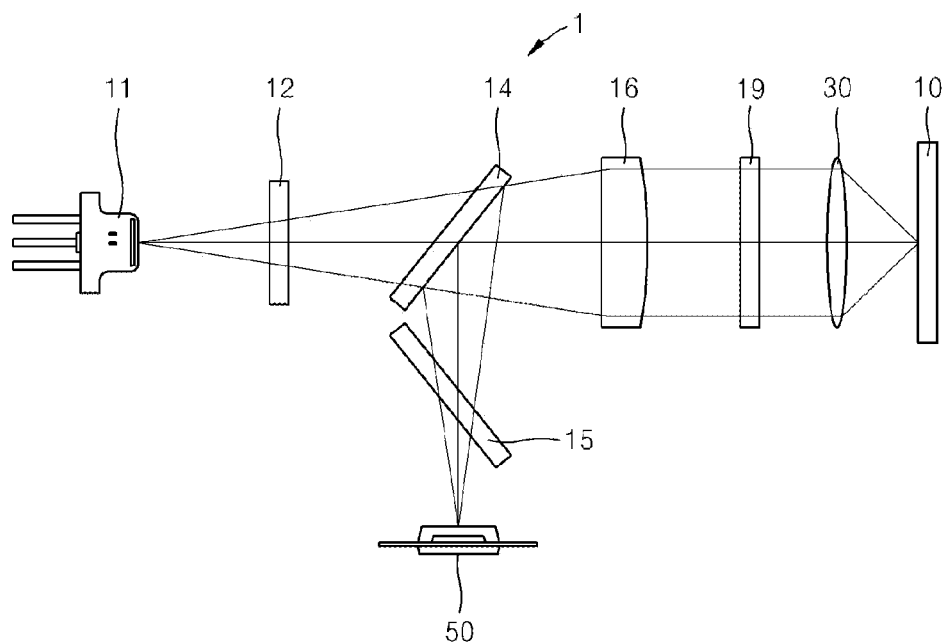
FIG. 1 is a diagram illustrating an example of an optical pickup.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of an optical pickup.

Referring to FIG. 1, the optical pickup 1 includes a light source unit 11, a diffracting element 12, an objective lens 30, and a photodetector 50. The diffracting element 12 may split light that is incident from the light source unit 11 into main light beam and a plurality of sub-light beams. The objective lens 30 forms a main light spot and a plurality of sub-light spots on an optical information storage medium 10 by focusing the main light beam and the sub-light beams incident thereon. The photodetector 50 detects an information signal and/or an error signal by receiving the main light beam and the sub-light beams which are reflected from the optical information storage medium 10. The optical pickup 1 may detect tracking error signals using zeroth-order light that is diffracted by the diffracting element 12 as the main light beam and using first-order light or third-order light diffracted by the diffracting element 12 as the sub-light beam according to a type of the optical information storage medium 10.

The optical pickup 1 may further include a collimating lens 16 and an optical path changer. The collimating lens 16 causes light to be incident on the objective lens 30 by collimating light emitted from the light source unit 11. The optical path changer changes a travelling path of incident light. In addition, the optical pickup 1 may further include a detecting lens 15 that causes light reflected from the optical information storage medium 10 to be input to the photodetector 50 with appropriate light spots.

The light source unit 11 may emit a plurality of lights of different wavelengths, for example, light of a first wavelength and light of a second wavelength, which are suitable for the optical information storage media having a plurality of types of different recording density and format. For example, when the optical pickup 1 is provided to be compatible with a CD and a DVD, the light source unit 11 may emit light of a red wavelength suitable for a DVD and light of infrared wavelength suitable for CD. For example, red light of a wavelength of about 650 nm may be emitted as the light of the first wavelength, and infrared light of a wavelength of about 780 nm may be emitted as the light of the second wavelength.

As an example, the light source unit 11 may include a twin light source in which first and second light sources emit light of the first wavelength and light of the second wavelength, respectively, which are suitable for the optical information storage media of a plurality of types. Here, the first and second light sources may be packaged into a single unit. As another example, the light source unit 11 may separately include the first light source and the second light source that emit the light of the first wavelength and the light of the second wavelength, respectively, and may further include an element that combines travelling paths of the first light and the second light. In some examples, the light source unit 11 may further include at least one other light source that emits light of another wavelength.

The objective lens 30 forms the main light spot and the sub-light spots on the optical information storage medium 10 by focusing the main light beam and the plurality of types of sub-light beams emitted from the light source unit 11 and split by the diffracting element 12. The objective lens 30 may be compatible with a DVD and a CD.

When the light source unit 11 emits the light of the red wavelength and the light of the infrared wavelength and the objective lens 30 has a numerical aperture that is compatible with a DVD and a CD, the optical pickup 1 may record and/or reproduce data to and from a DVD and a CD. For example, the DVD may include a DVD-R and a DVD-RAM and the CD may include a CD-R.

The wavelengths of the light emitted from the light source unit 11 and the numerical aperture of the objective lens 30 may be variously modified, and the optical configuration of the optical pickup 1 according to various aspects may also be variously modified.

In order to be compatible with a BD and a DVD, the optical pickup 1 may be configured such that the light source unit 11 emits light of a blue wavelength suitable for a high-density optical disc (for example, a BD) as the light of the first wavelength, and emits light of a red wavelength suitable for a DVD as the light of the second wavelength. In this example, the objective lens 30 may have an effective numerical aperture suitable for a BD and a DVD. As another example, the optical pickup 1 may further include a separate member that adjusts the effective numerical aperture.

Accordingly, the optical pickup 1 may record and/or reproduce data to and from a DVD and/or a CD through the optical configuration illustrated in FIG. 1, and may further include an additional optical configuration that records and/or reproduces data to and from a high-density optical information storage medium such as a BD.

For purposes of convenience only, unless otherwise specified, it should be understood that the optical configuration illustrated in FIG. 1 is used to record/reproduce a DVD and a CD and the light source unit 11 is provided as a two-wavelength light source, that is, a TWIN-LD that is compatible with a DVD and a CD.

The collimating lens 16 may collimate light emitted from the light source unit 11 and may cause the light to be incident on the objective lens 30. Here, the collimating lens 16 may be disposed between the optical path changer and the objective lens 30.

The optical path changer may direct light incident from the light source unit 11 toward the objective lens 30, and direct the light reflected from the optical information storage medium 10 toward the photodetector 50. For example, the optical path changer may include a polarization-dependent optical path changer such as a polarizing beam splitter 14 which converts a travelling path of incident light according to polarization. The optical pickup 1 may further include a quarter-wave plate 19 that changes the polarization of the incident light on the optical path between the polarizing beam splitter 14 and the objective lens 30. Although FIG. 1 illustrates an example in which the quarter-wave plate 19 is disposed between the collimating lens 16 and the objective lens 30, as another example, the quarter-wave plate 19 may be disposed between the polarizing beam splitter 14 and the collimating lens 16.

In an example in which the polarizing beam splitter 14 and the quarter-wave plate 19 are provided as described above, first linearly polarized light incident from the light source unit 11 to the polarizing beam splitter 14 may penetrate an inclined surface of the polarizing beam splitter 14. In this example, the light may be converted into first circularly polarized light while passing through the quarter-wave plate 19, and may travel toward the optical information storage medium 10. The first circularly polarized light may become second circularly polarized light orthogonal to the first circularly polarized light when being reflected from the optical information storage medium 10. Then, the second circularly polarized light may become second linearly polarized light orthogonal to the first linearly polarized light while passing through the quarter-wave plate 19. The second linearly polarized light may be reflected from the inclined surface of the polarizing beam splitter 14 and may be directed toward the photodetector 50.

Examples of the polarization-dependent optical path changer include a polarization hologram element that transmits one polarized light emitted from the light source unit 11 as it is, and performs +first-order or −first-order diffraction on another polarized light incident after reflection from the optical information storage medium 10. In an example in which the polarization hologram element is provided as the polarization-dependent optical path changer, the light source unit 11 and the photodetector 50 may be optically modularized.

As another example, the optical pickup 1 may include a beam splitter that transmits and reflects incident light at a predetermined rate, or a hologram element that transmits light emitted from the light source unit 11 as it is, and performs +first-order or −first-order diffraction on light incident after reflection from the optical information storage medium 10. In an example in which the hologram element is provided as the optical path changer, the light source unit 11 and the photodetector 50 may be optically modularized.

The detecting lens 15 may be configured such that light reflected from the optical information storage medium 10 and incident while passing through the objective lens 30 and the collimating lens 16 is input to the photodetector 50 with appropriate light spots. For example, the detecting lens 15 may be formed with an astigmatic lens that generates astigmatism so that a focus error signal is detected by an astigmatism method.

According to various aspects, a tracking error signal may be detected by the photodetector 50 using a three-beam method or by a differential push-pull method. The tracking error signal may be detected using zeroth-order light that is diffracted by the diffracting element 12 as the main light beam and using first-order light or third-order light diffracted by the diffracting element 12 (that is, ±first-order light or ±third-order light) as the sub-light beams according to the type of the optical information storage medium 10. For example, the first-order light may be used when a CD is employed as the optical information storage medium 10, and the third-order light may be used when a DVD is employed as the optical information storage medium 10.

Figure 2:
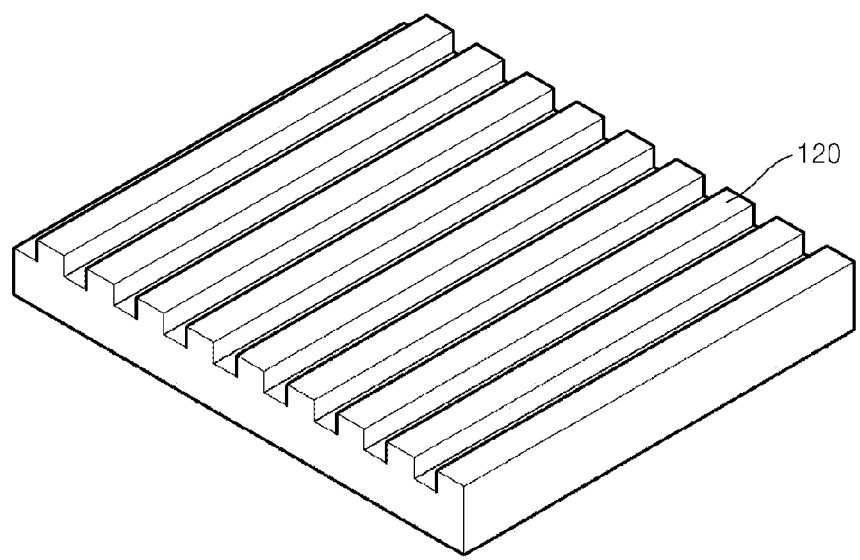
FIG. 2 is a diagram illustrating an example of a single-sided grating that is usable as a diffracting element in the optical pickup of FIG. 1.

According to various aspects, the diffracting element 12 may divide light incident from the light source unit 11 into a main light beam and a plurality of sub-light beams so that the tracking error signal may be detected using the three-beam method or the differential push-pull method. For example, the diffracting element 12 may split incident light into zeroth-order, ±first-order and ±third-order lights. In this example, with respect to the light of the first wavelength, the diffracting element 12 may be provided such that diffraction efficiency is approximately zeroth-order:first-order:third-order=4-15: 0.5-1:1, and second-order diffraction efficiency is approximately zero. In this example, with respect to the light of the second wavelength, the diffraction efficiency for zeroth-order, first-order and third-order lights of the diffracting element 12 may be similar to the diffraction efficiency for the light of the first wavelength. As illustrated in FIG. 2, the diffracting element 12 may be a single-sided grating 120 in which linear grids are uniformly arranged.

According to various aspects, the diffracting element 12 may be provided such that a spacing of the third-order light, that is, a spacing between the zeroth-order light and the ±third-order light, on the optical information storage medium 10, corresponds to 2.5 tracks of a DVD-R.

Figure 3:
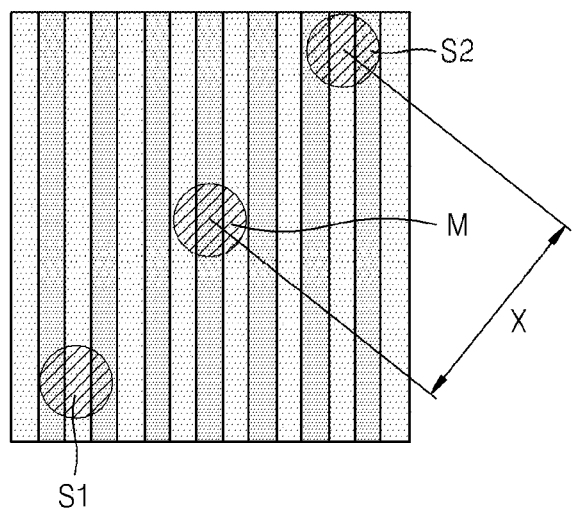
FIG. 3 is a diagram illustrating an example in which light of a first wavelength suitable for a DVD is diffracted by the diffracting element, and a main light spot of zeroth-order light and a sub-light spot of ±third-order light are formed on a DVD-R.
Figure 4:
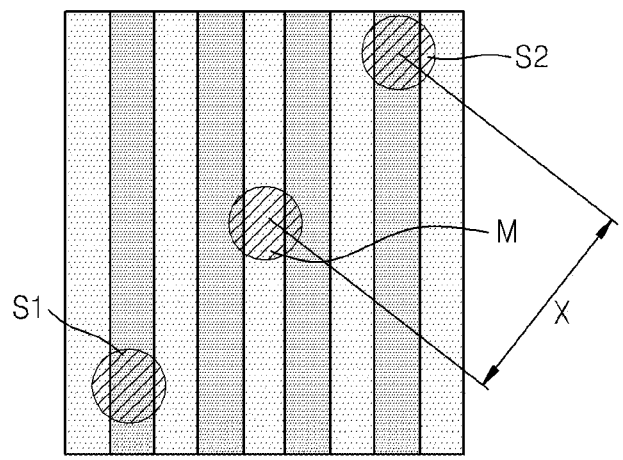
FIG. 4 is a diagram illustrating an example in which light of a first wavelength suitable for a DVD is diffracted by the diffracting element, and a main light spot of zeroth-order light and a sub-light spot of ±third-order light are formed on a DVD-RAM.
Figure 5:
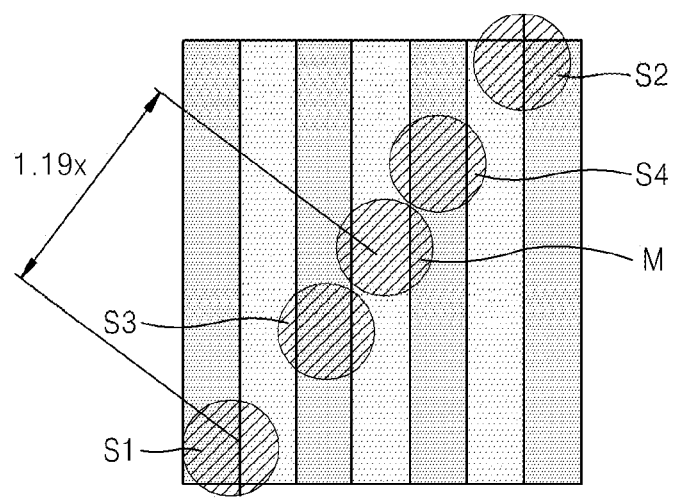
FIG. 5 is a diagram illustrating an example in which light of a second wavelength suitable for a CD is diffracted by a diffracting element, and a main light spot of zeroth-order light and a sub-light spot of ±first-order light are formed on a CD-R.

FIGS. 3 to 5 illustrate examples in which light is diffracted to zeroth-order light, ±first-order light, and ±third-order light by the diffracting element 12 and is formed as a main light spot M and sub-light spots S1, S2, S3, and S4 on a DVD-R, a DVD-RAM, and a CD-R so as to correspond to 2.5 tracks of a DVD-R. FIGS. 3 and 4 illustrate examples in which light of the first wavelength, for example, light of the red wavelength suitable for a DVD, is diffracted by the diffracting element 12. Here, the main light spot M of the zeroth-order light and the sub-light spots S1 and S2 of the ±third-order light are formed on a DVD-R and a DVD-RAM, respectively. FIG. 5 illustrates an example in which light of the second wavelength, for example, light of the infrared wavelength suitable for a CD, is diffracted by the diffracting element 12, and the main light spot M of the zeroth-order light and the sub-light spots S3 and S4 of the ±first-order light are formed on a CD-R.

In detecting the tracking error signal for the DVD-R and the DVD-RAM, the sub-light spots S1 and S2 of the ±third-order light are formed to correspond to 2.5 tracks of a DVD-R. In this example, the zeroth-order light is used as the main light, and the ±third-order light is used as the sub-light. Here, the first-order light is not used. Thus, for convenience, the sub-light spots S3 and S4 of the ±first-order light diffracted by the diffracting element 12 are not illustrated in FIGS. 3 and 4. In FIGS. 3 to 5, reference character "X" represents a spacing of the third-order light with respect to the light of the first wavelength on the optical information storage medium 10, that is, a spacing between the zeroth-order light and the ±third-order light.

Referring to FIG. 3, when the third-order light diffracted by the diffracting element 12 corresponds to 2.5 tracks of a DVD-R, the sub-light spots S1 and S2 of the ±third-order light are formed at positions that are separated from the main light spot M of the zeroth-order light by about 2.5 tracks on the DVD-R. In this example, a phase difference between the push-pull signal MPP of the zeroth-order light reflected from the DVD-R, that is, the main light, and the push-pull signal SPP of the ±third-order light reflected from the DVD-R, that is, the sub-light, is about 180 degrees.

Referring to FIG. 4, when the third-order light diffracted by the diffracting element 12 corresponds to 2.5 tracks of a DVD-R, the sub-light spots S1 and S2 of the ±third-order light are formed at positions that are separated from the main light spot M of the zeroth-order light by about 1.5 tracks on a DVD-RAM. In this case, a phase difference between the push-pull signal MPP of the zeroth-order light reflected from the DVD-RAM, that is, the main light, and the push-pull signal SPP of the ±third-order light reflected from the DVD-RAM, that is, the sub-light, is about 181.46 degrees.

Referring to FIG. 5, when the spacing of the third-order light with respect to the light of the first wavelength is represented by "X", the spacing of the third-order light with respect to the light of the second wavelength is larger than "X". This increase is because a diffraction angle for each order in the diffracting element 12 is increased as the wavelength of the incident light is longer. In this example, when the spacing of the third-order light with respect to the light of the first wavelength of about 660 nm is "X", the spacing of the third-order light with respect to the light of the second wavelength of 785 nm is increased by about "1.19X".

When the third-order light with respect to the light of the first wavelength, which is diffracted by the diffracting element 12, corresponds to 2.5 tracks of a DVD-R, as illustrated in FIG. 5, the sub-light spots S3 and S4 of the ±first-order light with respect to the light of the second wavelength are formed at positions separated from the main light spot M of the zeroth-order light by about 0.5 track on the CD-R. In this example, a phase difference between the push-pull signal MPP of the zeroth-order light reflected from the CD-R, that is, the main light, and the push-pull signal SPP of the ±first-order light reflected from the CD-R, that is, the sub-light, is within the range of about 180 degrees±30 degrees. For example, a 650 MB CD-R shows a phase difference of about 165.25 degrees, which is deviated by about 15 degrees from 180 degrees. A 700 MB CD-R shows a phase difference of about 177.93 degrees, which is deviated by about 2 degrees from 180 degrees. An 800 MB CD-R shows a phase difference of about 203.39 degrees, which is deviated by about 23 degrees from 180 degrees.

As such, if the third-order light is used as the sub-light when a DVD is employed, the first-order light is used as the sub-light when a CD is employed, and 2.5 tracks are applied to a DVD-R, the optical pickup 1 according to various aspects herein, may implement tracking that is compatible with a DVD-R, a DVD-RAM, and a CD-R, even though the single-sided grating is used as the diffracting element 12.

As another example, the photodetector 50 may receive the light of the first wavelength and the light of the second wavelength, obtain a reproduction signal from a detection signal of the main light beam reflected from the optical information storage medium 10, and obtain the tracking error signal through the three-beam method or the differential push-pull method by operations of the detection signals of the main light beam and the sub-light beams reflected from the optical information storage medium 10.

Figure 6:
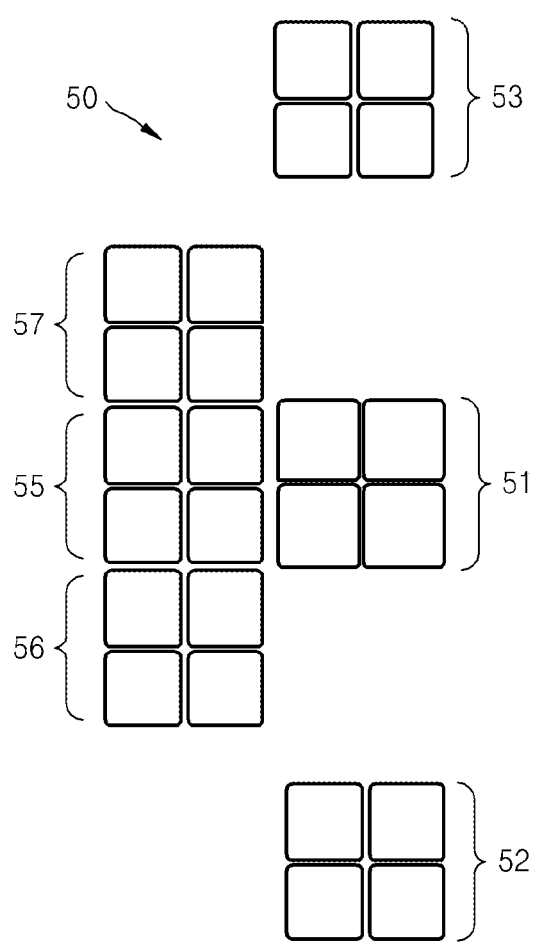
FIG. 6 is a diagram illustrating an example of a photodetector that may be employed in the optical pickup of FIG. 1.

FIG. 6 illustrates an example of the photodetector 50 employed in the optical pickup 1.

Referring to FIG. 6, the photodetector 50 includes a first main light receiving unit 51 and first sub-light receiving units 52 and 53 that receive the main light beam and the sub-light beam, respectively, with respect to the light of the first wavelength suitable for a DVD. The photodetector 50 also includes a second main light receiving unit 55 and second sub-light receiving units 56 and 57 that receive the main light beam and the sub-light beam, respectively, with respect to the light of the second wavelength suitable for a CD. To enable the detection of push-pull signals, for example, the first sub-light receiving units 52 and 53 and the second sub-light receiving units 56 and 57 may have a four-segmented structure as illustrated in FIG. 6. As another example, the sub light receiving units may have a two-segmented structure. In addition, to enable the detection of focus error signals or the like by the astigmatism method, for example, the first main light receiving unit 51 and the second main light receiving unit 55 may have a four-segmented structure.

Because the tracking error signal for a DVD uses the zeroth-order light and the ±third-order light and the tracking error signal for a CD uses the zeroth-order light and the ±first-order light, as illustrated in FIG. 6, the spacing between the first main light receiving unit 51 and the first sub-light receiving units 52 and 53 for the DVD may be, for example, about three times the spacing between the second main light receiving unit 55 and the second sub-light receiving units 56 and 57 for the CD.

As another example, when responding to the eccentric disc of the CD, there is a difference in the degree of influence according to the spacing between the main light spot and the sub-light spot in the optical information storage medium 10. As the spacing between the main light spot and the sub-light spot decreases, the response ability to the eccentric disc is improved. For example, in the case of using the sub-light spots of the ±first-order light in which the spacing between the main light spot and the sub-light spot is closer, the eccentric disc response ability may be improved.

According to various aspects, the zeroth-order light and the third-order light are used to detect the tracking error signal with respect to a DVD-R and a DVD-RAM, and the zeroth-order light and the first-order light are used to detect the tracking error signal with respect to a CD-R. Accordingly, a good response ability may be implemented even though the eccentric disc of the CD is used.

Figure 7:
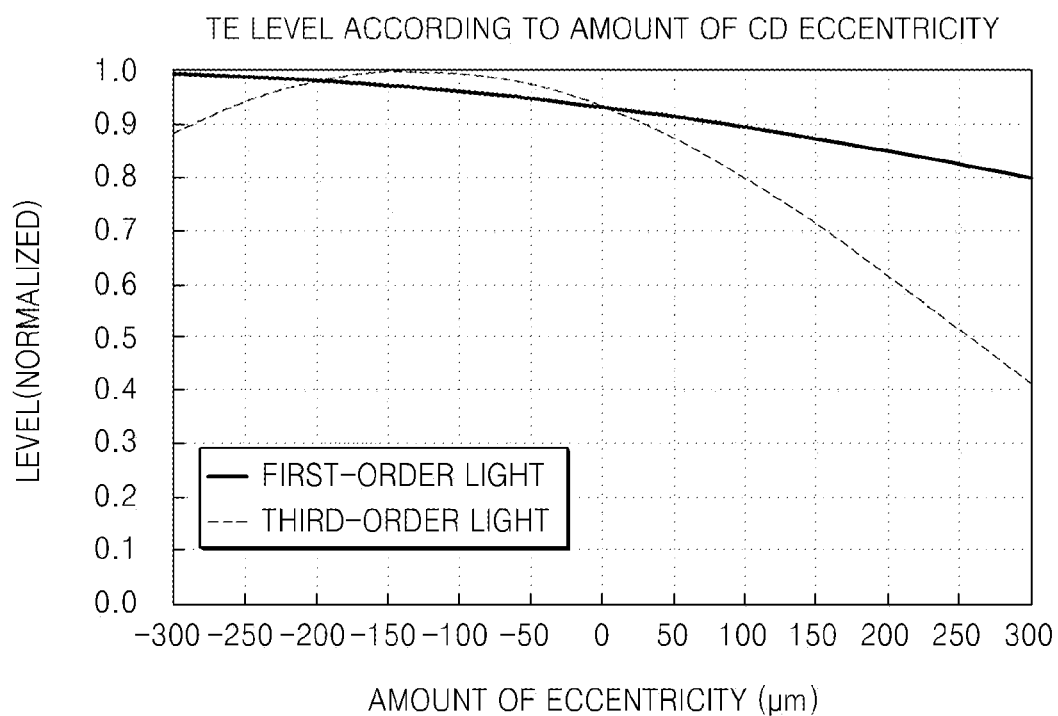
FIG. 7 is a graph diagram illustrating an example of a level variation in a tracking error signal according to an amount of CD eccentricity when first-order light and third-order light are used.

In the example of the simulation result of FIG. 7 which shows the level variation in the tracking error signal according to an amount of CD eccentricity when the first-order light and the third-order light are used, the level variation in the tracking error signal is not great in the case of using the first-order light, in spite of the CD eccentricity. That is, in the case of using the first-order light, the tracking servo may be implemented with respect to the CD eccentric disc having a considerable amount of eccentricity. In the case of using the third-order light, the level variation in the tracking error signal according to the amount of CD eccentricity is great. Accordingly, the use of the third-order light with respect to a CD may be inappropriate.

The example simulation result of FIG. 7 shows the level variation when the phase of the diffracting element is distorted by about 30 degrees in the eccentric disc. From the simulation result of FIG. 7, it can be seen that the case of using the ±first-order lights, in which the spacing between the main light spot and the sub-light spot is close, may ensure a favorable tracking servo implementation.

Figure 8:
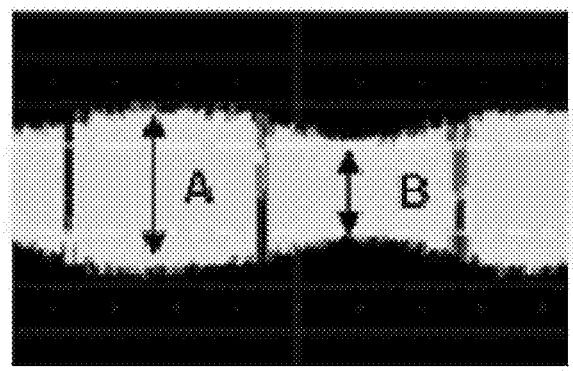
FIG. 8 is a diagram illustrating an example of a differential push-pull signal (Dpp) modulation.

FIG. 8 illustrates an example of a differential push-pull signal (Dpp) modulation. The Dpp modulation may be expressed as B/A*100, where A is a maximum width of the modulation, and B is a minimum width of the modulation. In an example in which a distance between the sub-light spot of the ±first-order light and the main light spot is about 8.26 µm, the Dpp modulation is about 80%. In an example in which a distance between the sub-light spot of the ±third-order light and the main light spot is about 24.8 µm, the Dpp modulation is about 47%. As the difference between A and B decreases, that is, as the Dpp modulation becomes closer to 100%, the eccentricity response ability improves. Therefore, based on the Dpp modulation result the eccentric disc response ability is better in the case of using the ±first-order light than in the case of using the ±third-order light with respect to a CD.

Figure 9:
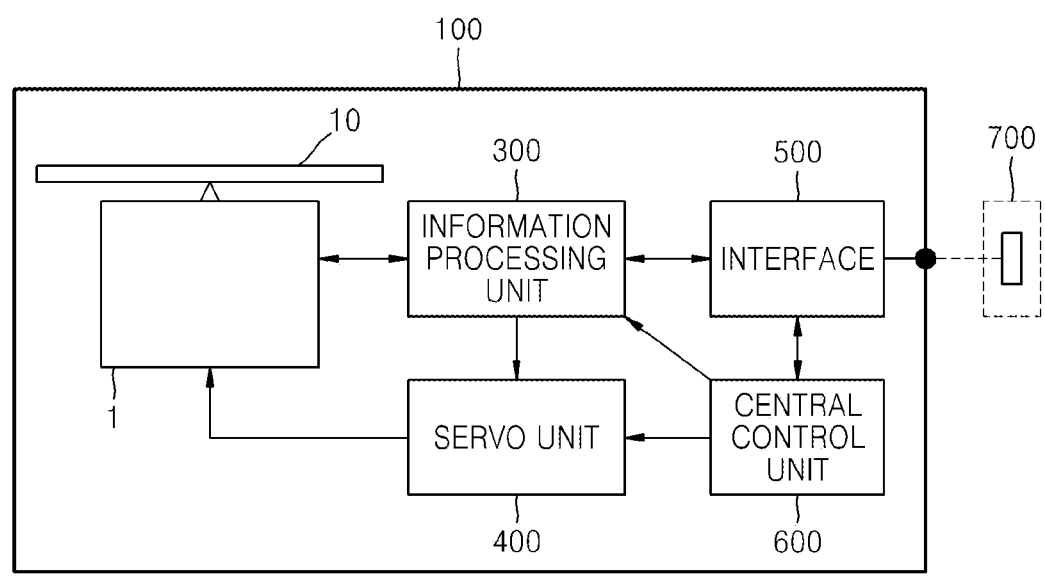
FIG. 9 is a diagram illustrating an example of an optical information storage system employing an optical pickup.

FIG. 9 illustrates an example of an optical information storage system 100 employing the optical pickup 1.

Referring to FIG. 9, the optical information storage system 100 includes the optical pickup 1 and a control unit 600. For example, the optical information storage system 100 may be or may include an optical disc drive. The optical pickup 1 is arranged movably in a radial direction of the optical information storage medium 10, and reproduces information recorded on the optical information storage medium 10 and records information to the optical information storage medium 10. The control unit 600 controls the optical pickup 1.

The optical pickup 1 includes an optical system that has various configurations, as described above, and a mechanism system that mechanically supports the optical system and performs focusing and tracking operations. The optical system may include an encoder/decoder and may be connected to an information processing unit 300 connected to an interface 500 for connection to an external host, and the mechanism system is connected to a servo unit 400. The information processing unit 300, the servo unit 400, and the interface 500 may be controlled by the control unit 600, that is, a central control unit. The interface 500 may comply with various standards. For example, the interface 500 may include a USB port. Therefore, the interface 500 may be connected to a host, for example, a computer 700, by the USB protocol, and exchange information with the computer 700.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical pickup comprising:
    a light source unit configured to emit light comprising a plurality of different wavelengths for a plurality of types of information storage media, which each have a different recording density and format;
    a diffracting element configured to diffract light that is incident from the light source unit into a main light beam and a plurality of sub-light beams including first-order light and third-order light, the diffracting element further configured to direct the diffracted light onto an information storage medium; and
    a photodetector that receives the main light beam and the sub-light beams, which are reflected from the information storage medium, and detects a tracking error signal using zeroth-order light as the main light and further using one of the first-order light and third-order light as the sub-light based on the type of the information storage medium, wherein
    the spacing between the zeroth-order light and the third-order light on the information storage medium corresponds to 2.5 tracks of a digital versatile disc-recordable (DVD-R).

2. The optical pickup of claim 1, wherein:
    the information storage media comprise a DVD and a compact disc (CD),
    the light source unit emits light of the first wavelength for the DVD and light of the second wavelength for the CD,
    the third-order light is used as the sub-light when the information storage medium is the DVD, and
    the first-order light is used as the sub-light when the information storage medium is the CD.

3. The optical pickup of claim 1, wherein the photodetector comprises:

a first main light receiving unit and a first sub-light receiving unit configured to receive the main light and the sub-light, respectively, of the first wavelength; and a second main light receiving unit and a second sub-light receiving unit configured to receive the main light and the sub-light, respectively, of the second wavelength.

4. The optical pickup of claim 1, wherein a tracking servo is implemented with respect to a compact disc (CD), a DVD-R, and a DVD-random access memory (DVD-RAM).

5. The optical pickup of claim 1, wherein the diffracting element diffracts incident light into zeroth-order light, ±first-order light, and ±third-order light.

6. The optical pickup of claim 5, wherein the diffracting element exhibits a diffraction efficiency of zeroth-order:first-order:third-order approximately=4-15:0.5-1:1 with respect to the light of the first wavelength.

7. The optical pickup of claim 6, wherein the diffracting element comprises a grating in which linear grids are uniformly arranged.

8. The optical pickup of claim 6, wherein the diffracting element is provided such that second-order diffraction efficiency becomes zero with respect to the light of the first wavelength.

9. The optical pickup of claim 1, further comprising an objective lens configured to form a main light spot and a plurality of sub-light spots on the information storage medium by focusing the main light beam and the plurality of sub-light beams received from the diffracting element thereon.

10. An optical pickup comprising:
a light source unit configured to emit light comprising a first wavelength for a digital versatile disc (DVD) and a second wavelength for a compact disc (CD);
a diffracting element configured to diffract light incident from the light source unit into a main light beam and a plurality of sub-light beams including first-order light and third-order light, the diffracting element further configured to direct the diffracted light onto an information storage medium; and
a photodetector configured to receive the main light beam and the plurality of sub-light beams reflected from the information storage medium and detect a tracking error signal using zeroth-order light as the main light and using one of the first-order light and the third-order light as the sub-light based on whether the information storage medium is a DVD or a CD, wherein
the spacing between the zeroth-order light and the third-order light on the information storage medium corresponds to 2.5 tracks of a DVD-recordable (DVD-R).

11. The optical pickup of claim 10, wherein the photodetector comprises:
a first main light receiving unit and a first sub-light receiving unit configured to receive the main light and the sub-light, respectively, of the first wavelength; and a second main light receiving unit and a second sub-light receiving unit configured to receive the main light and the sub-light, respectively, of the second wavelength, wherein:
the third-order light is used as the sub-light when the information storage medium is a DVD,
the first-order light is used as the sub-light when the information storage medium is a CD, and
a tracking servo is implemented with respect to a CD, a DVD-R, and a DVD-read only memory (DVD-RAM).

12. The optical pickup of claim 10, wherein the diffracting element diffracts incident light into zeroth-order light, ±first-order light, and ±third-order light.

13. The optical pickup of claim 12, wherein the diffracting element exhibits a diffraction efficiency of zeroth-order:first-order:third-order approximately=4-15:0.5-1:1 with respect to the light of the first wavelength.

14. The optical pickup of claim 13, wherein the diffracting element is provided such that second-order diffraction efficiency becomes zero with respect to the light of the first wavelength.

15. The optical pickup of claim 12, wherein the diffracting element comprises a grating in which linear grids are uniformly arranged.

16. The optical pickup of claim 10, wherein the light source unit comprises a twin light source in which first and second light sources emitting the light of the first wavelength and the light of the second wavelength are packaged into a single unit.

17. An optical disc drive comprising:
an optical pickup device configured to read data from and/or write data to an information storage medium, the optical pickup device comprising a photodetector configured to receive a main light beam and a plurality of sub-light beams reflected from the information storage medium and configured to detect a tracking error signal using zeroth-order light as main light and further using one of first-order light and third-order light as the sub-light based on the type of the information storage medium; and
a controller configured to control the optical pickup device to detect the tracking error signal, wherein
the spacing between the zeroth-order light and the third-order light on the information storage medium corresponds to 2.5 tracks of a digital versatile disc-recordable (DVD-R).

18. The optical disc drive of claim 17, wherein the photodetector uses the first-order light as the sub-light for tracking error of a compact disc (CD), and
the photodetector uses the third-order light as the sub-light for tracking error of a DVD.

* * * * *